(12) United States Patent
Komaki et al.

(10) Patent No.: US 7,018,697 B2
(45) Date of Patent: Mar. 28, 2006

(54) OPTICAL RECORDING MEDIUM

(75) Inventors: Tsuyoshi Komaki, Tokyo (JP); Kenji Yamaga, Tokyo (JP); Takashi Yamada, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/854,713

(22) Filed: May 27, 2004

(65) Prior Publication Data

US 2004/0241378 A1 Dec. 2, 2004

(30) Foreign Application Priority Data

May 29, 2003 (JP) .............................. 2003-152960

(51) Int. Cl.
*B32B 3/02* (2006.01)
(52) U.S. Cl. .................. 428/64.1; 428/64.4; 428/64.5; 430/270.13
(58) Field of Classification Search ............... 428/64.1, 428/64.4, 64.5, 913; 430/270.11, 270.13
See application file for complete search history.

(56) References Cited

U.S. PATENT DOCUMENTS

| 6,811,850 B1 * | 11/2004 | Hirata ........................ 428/64.2 |
| 2005/0013962 A1 * | 1/2005 | Ederle et al. .............. 428/64.2 |

FOREIGN PATENT DOCUMENTS

| EP | 0240752 | * 10/1987 |
| JP | 63-248812 | * 10/1988 |
| JP | 63-270712 | * 11/1988 |
| JP | A 6-228234 | 8/1994 |
| JP | 08-096408 | * 4/1996 |
| JP | A 10-302305 | 11/1998 |
| JP | A 2002-25108 | 1/2002 |
| JP | A 2002-170281 | 6/2002 |
| JP | A 2003-85836 | 3/2003 |

* cited by examiner

*Primary Examiner*—Elizabeth Mulvaney
(74) *Attorney, Agent, or Firm*—Oliff & Berridge, PLC

(57) ABSTRACT

An optical recording medium including a substrate and a light transmitting layer provided on the substrate so as to have a smaller thickness than that of the substrate, which is hardly warped and excellent in electrical characteristics and productivity, is provided. An optical recording medium includes: a substrate; and a light transmitting layer having a smaller thickness than that of the substrate. In this medium, a material of the substrate is an olefin maleimide copolymer.

1 Claim, 1 Drawing Sheet

OPTICAL RECORDING MEDIUM

BACKGROUND OF THE INVENTION

1. Field of the Invention

The present invention relates to an optical recording medium including a substrate and a light transmitting layer having a smaller thickness than that of the substrate.

2. Description of the Related Art

A substrate of an optical recording medium is generally formed by injection molding so as to transfer an information pattern such as pits and grooves thereon. Therefore, it is important that a material of the substrate is excellent in moldability and transferability. Moreover, for the following reason, a material excellent in moldability and transferability as well as in light transmittance is generally used as a material of the substrate for an optical recording medium.

For example, a CD (Compact Disc) includes a substrate having a thickness of 1.2 mm that also serves as a light transmitting layer. Therefore, polycarbonate or the like, which is excellent in light transmittance, is used as a material of the substrate.

On the other hand, a DVD (Digital Versatile Disc) includes, for example, a substrate having a thickness of 0.6 mm and a dummy substrate (a substrate serving to maintain the rigidity) having a thickness of 0.6 mm, which are bonded to each other, as an example. If a material of the substrate differs from that of the dummy substrate, a warp is likely to occur due to a sudden change in ambient temperature within a short period of time. Therefore, the same material is generally used for the substrate and the dummy substrate. Since polycarbonate or the like having excellent light transmittance is used as a material of the substrate, polycarbonate or the like is also generally used as a material of the dummy substrate.

In recent years, in order to remarkably increase a recording capacity, blue-violet laser light having a short wavelength of about 405 nm is used while a numerical aperture of an objective lens is increased to about 0.85. In order to follow such improvement, an optical recording medium including: a substrate having a thickness of about 1.1 mm; and a light transmitting layer formed on the substrate so as to have a thickness of about 0.1 mm, which is smaller than that of the substrate, has attracted attention (for example, see Japanese Patent Laid-Open Publication No. 2003-85836). The optical recording medium has a gap of about 150 nm with a head, and therefore has a remarkably reduced gap as compared with a CD or a DVD having a gap of about several mm with a head.

The optical recording medium is fabricated by injection molding a substrate, and forming a light transmitting layer by spin-coating or bonding a light transmitting film on the substrate. Since a fabrication method of the substrate or the like differs from that of the light transmitting layer, the substrate and the light transmitting layer differ from each other not only in thickness but also in material in many cases.

As a material of a substrate, polycarbonate or the like is used, because polycarbonate meets performance targets as a material of the substrate for a conventional optical recording medium and has reliability in view of moldability and transferability. On the other hand, as a material of the light transmitting layer, a light transmitting film made of a radiation curable resin cured by a radiation ray such as an ultraviolet ray or an electron beam is used.

However, since the optical recording medium has an asymmetric structure composed of the substrate and the light transmitting layer which differ from each other in material as well as in thickness, there arises a problem that a warp is likely to occur due to a sudden change in ambient temperature within a short period of time and the like. If the warp is large, the optical recording medium is brought into contact with a head or a gap with the head becomes too large or too small to easily cause an error in information recording/reading. For this reason, it is necessary to restrain the warp within a predetermined limit value.

On the other hand, if a metal or glass is used as a material of the substrate, the warp can be kept within a predetermined limit value. However, such a material is not preferred in view of productivity and cost.

If a thickness of the substrate is increased or a rib or the like is formed on the substrate, the rigidity of the substrate can be increased thereby so as to restrain the warp. At the same time, however, such a change in shape of the substrate also requires a change in design of a recording/reading device, and therefore, is not preferred in view of compatibility and cost.

It is also conceivable to increase the rigidity by adding a predetermined filler in a material of the substrate. However, the addition of a filler degrades the moldability of a substrate and the transferability of an information pattern, resulting in the opposite effect to adversely affect electrical characteristics such as a degraded jitter and an increased number of errors.

SUMMARY OF THE INVENTION

The present invention was devised in view of the above problem and has an object of providing an optical recording medium including a substrate and a light transmitting layer formed on the substrate so as to have a smaller thickness than that of the substrate, which is hardly warped and excellent in electrical characteristics and productivity.

The present invention achieves the object by using an olefin maleimide copolymer as a material of a substrate.

In the course of thinking up the present invention, the inventor of the present invention has focused attention on the fact that, unlike a CD or a DVD, it is not necessarily required to use a material excellent in light transmittance as a material of a substrate for an optical recording medium including a substrate and a light transmitting layer having a smaller thickness than that of the substrate because of the particularity of a structure of the optical recording medium. As a result, the inventor of the present invention is led to the idea that a material of the substrate is selected in view of the rigidity rather than of the light transmittance. As a result of examination of various materials of the substrate in accordance with the idea, it is found out that an olefin maleimide copolymer has a high rigidity and is also suitable as a material of the substrate of the optical recording medium in view of the moldability and the transferability of an information pattern. In other words, it was conventionally common to use polycarbonate or the like, which meets performance targets in view of the moldability, the transferability and the light transmittance, as a material of the substrate of the optical recording medium. On the other hand, in the present invention, a material different from a conventionally used one is used as a material of the substrate in view of the particularity of a structure of an optical recording medium including a substrate and a light transmitting layer having a smaller thickness than that of the substrate, thereby achieving the above object. In summary, the above-described objectives are achieved by the following aspects of the present invention.

(1) An optical recording medium comprising:
a substrate; and a light transmitting layer having a thickness smaller than that of the substrate, wherein a material of the substrate is an olefin maleimide copolymer.

(2) The optical recording medium according to (1) wherein the olefin maleimide copolymer is a copolymer comprising: at least one kind of an N-phenyl-substituted maleimide unit represented by the general formula (I), at least one kind of an N-alkyl maleimide unit represented by the general formula (II), and an (α-olefin unit represented by the general formula (III), and wherein a copolymer composition is such that a total content of (I) and (II) is in a range of 30 to 98 mol % and a content of (III) is in a range of 70 to 2 mol %, and a weight-average molecular weight relative to polystyrene is in a range of $1 \times 10^3$ to $5 \times 10^6$

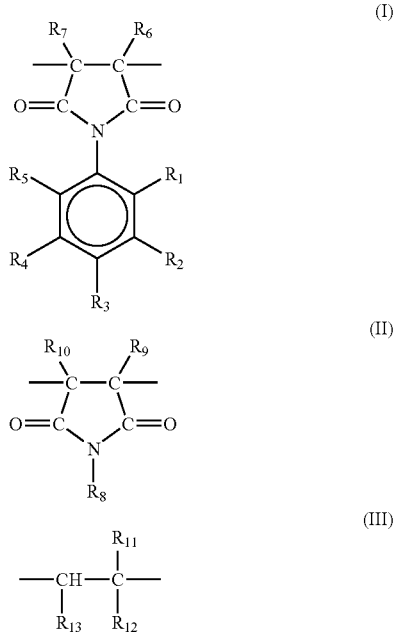

where $R_1$, $R_2$, $R_3$, $R_4$, $R_5$, $R_6$, $R_7$, $R_8$, $R_9$ and $R_{10}$ are independently hydrogen, halogen, a carboxylic acid, or a straight-chain or branched alkyl group having 1 to 8 carbon atoms, and $R_{11}$, $R_{12}$, and $R_{13}$ are independently hydrogen or an alkyl group having 1 to 6 carbons.

DETAILED DESCRIPTION OF THE PREFERRED EMBODIMENT

Hereinafter, a preferred embodiment of the present invention will be described in detail with reference to the accompanying drawings.

Figure 1:
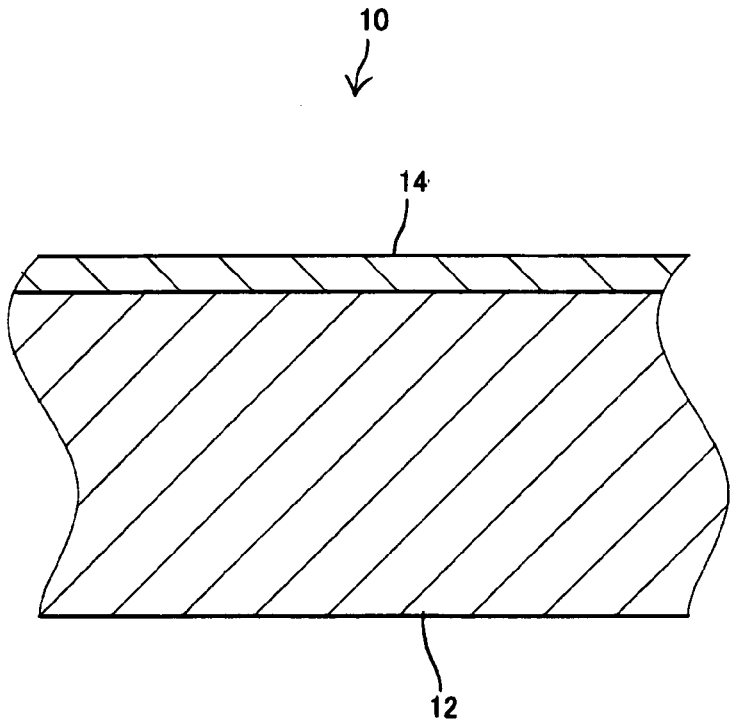
FIG. 1 is a sectional side view schematically showing a structure of an optical recording medium according to an embodiment of the present invention.

FIG. 1 is a sectional side view schematically showing a structure of an optical recording medium 10 according of the present invention.

The optical recording medium 10 includes: a substrate 12; and a light transmitting layer 14 having a smaller thickness than that of the substrate 12, and is characterized in that a material of the substrate 12 is an olefin maleimide copolymer having a high rigidity. Since the remaining structure is similar to that of a conventional optical recording medium, the description thereof is herein appropriately omitted.

The substrate 12 has a disc-like shape having a thickness of about 1.1 mm, an outer diameter of about 120 mm, and an inner diameter of about 15 mm. On a surface of the substrate 12 on the side of the light transmitting layer 14, a fine information pattern such as pits and grooves not shown is transferred.

As an olefin maleimide copolymer constituting the substrate 12, for example, an olefin maleimide copolymer as disclosed in Japanese Patent Laid-Open Publication No. Hei 5-117334 is preferably used. The olefin maleimide copolymer has a high rigidity and a good light transmittance.

Specifically, the olefin maleimide copolymer is a copolymer comprising: at least one kind of an N-phenyl-substituted maleimide unit represented by the general formula (I), at least one kind of an N-alkyl maleimide unit represented by the general formula (II), and an α-olefin unit represented by the general formula (III), where a copolymer composition is such that a total content of (I) and (II) is in a range of 30 to 98 mol % and a content of (III) is in a range of 70 to 2 mol %; and a weight-average molecular weight relative to polystyrene is in a range of $1 \times 10^3$ to $5 \times 10^6$.

Examples of the compounds giving the constituent unit (I) include N-phenyl maleimide, N-(2-methylphenyl) maleimide, N-(2-ethylphenyl) maleimide, N-(2-isopropyl) phenyl maleimide, N-(3-methylphenyl) maleimide, N-(3-ethylphenyl) maleimide, N-(4-methylphenyl) maleimide, N-(4-ethylphenyl) maleimide, N-(2,6-dimethylphenyl) maleimide, N-(2,6-diethylphenyl) maleimide, N-(2,6-diisopropylphenyl) maleimide, N-(2,4,6-trimethylphenyl) maleimide, N-carboxyphenyl maleimide, N-(2-chlorophenyl) maleimide, N-(2,6-dichlorophenyl) maleimide, N-(2-bromophenyl) maleimide, N-(perbromophenyl) maleimide, N-(2,4-dimethylphenyl) maleimide, para-tolylmaleimide, and the like. These can be used solely or in combination of two or more thereof for polymerization; in the case of combination, a ratio of the compounds is not particularly limited.

In addition, a unit given by the N-alkyl maleimides represented by the general formula (II) may be copolymerized with the above-mentioned phenyl maleimide as long as the object of the present invention is achieved.

Examples of the compounds giving the unit (II) include the following N-alkyl-substituted maleimides; N-methyl maleimide, N-ethyl maleimide, N-n-propyl maleimide, N-i-propyl maleimide, N-n-butyl maleimide, N-i-butyl maleimide, N-s-butyl maleimide, N-t-butyl maleimide, N-n-pentyl maleimide, N-n-hexyl maleimide, N-n-heptyl maleimide, N-n-octyl maleimide, N-lauryl maleimide, N-stearyl maleimide, N-cyclopropyl maleimide, N-cyclobutyl maleimide, N-cyclohexyl maleimide, and N-methyl citraconimide. These can be used solely or in combination of two or more thereof for polymerization; in the case of combination, a ratio of the compounds is not particularly limited.

Examples of the compounds giving the constituent unit (III) include olefins such as isobutene, 2-methyl-1-butene, 2-methyl-1-pentene, 2-methyl-1-hexene, 2-methyl-1-heptene, 1-isooctene, 2-methyl-1-octene, 2-ethyl-1-pentene, 2-methyl-2-butene, 2-methyl-2-pentene, 2-methyl-2-hexene, ethylene, propylene, 1-butene, 2-butene, and 1-hexene. Among them, 1,2-di-substituted olefins, in particular, isobutene is preferably used. These olefins can be used solely or in combination of two or more thereof for polymerization; in the case of combination, a ratio of the compounds is not particularly limited.

A total content of the units (I)+(II) is in the range of 30 to 98 mol % of the whole copolymer, preferably, 40 to 75 mol %, more preferably, 50 to 70 mol %. If the total content of the units (I)+(II) exceeds 98 mol %, the produced resin becomes brittle. On the other hand, if the total content is less than 30 mol %, the heat resistance of the resin is decreased. Therefore, it is not preferred that the total content is out of the above-described range.

Moreover, if required, the copolymer can be copolymerized with another vinyl monomer as long as the object of the present invention is achieved.

As another vinyl monomer, at least one component selected from: styrene, α-methylstyrene, vinyltoluene, 1,3-butadiene, isoprene and halogen-substituted derivatives thereof; acryl esters such as methyl methacrylate; vinyl esters such as vinyl acetate and vinyl benzoate; vinyl ethers such as methyl vinyl ether; vinyl chloride, vinylidene chloride, maleic anhydride, and acrylonitrile, can be given.

These monomers can be polymerized by any known polymerization method, for example, self-polymerization, solution polymerization, suspension polymerization, and emulsion polymerization; in particular, the solution polymerization is preferred.

Moreover, at least two alkyl-substituted and phenyl-substituted maleimide monomers may be combined so as to be copolymerized with an olefin monomer.

As combinations thereof, for example, N-methyl maleimide/N-methylphenyl maleimide/isobutene, N-methyl maleimide/ N-(2,6-diethylphenyl) maleimide/isobutene, N-cyclohexyl maleimide/N-methylphenyl maleimide/isobutene, N-cyclohexyl maleimide/N-(2,6-diethylphenyl) maleimide/isobutene, N-ethyl maleimide/N-methylphenyl maleimide/isobutene, N-ethyl maleimide/N-(2,6-diethylphenyl) maleimide/isobutene and the like are preferred. As a combination of phenyl-substituted maleimide monomers, N-phenylmaleimide/N-methylphenyl maleimide/isobutene, N-phenylmaleimide/N-(2,6-diethylphenyl) maleimide/isobutene and the like are preferred.

To the olefin maleimide copolymer used in the embodiment of the present invention, an anti-oxidant such as hindered phenol and organic phosphate, a benzotriazole UV absorber, a hindered amine UV stabilizer, various lubricants, and a dye can be added as needed.

In addition, the olefin maleimide copolymer used in the embodiment can be mixed with another resin, a thermoplastic resin, a thermoplastic elastomer, or a solid or liquid rubber, which are compatible with the olefin maleimide copolymer, as needed.

Furthermore, an inorganic filler can be added to the olefin maleimide copolymer used in the embodiment of the present invention so as to improve the mechanical characteristics, as needed.

As examples of such a filler, for example, a glass fiber (commonly known as an E-glass fiber), a powder, a paste, a microbead, a microrod, a microdisc and the like, made of an aluminosilicate glass on the basis of an oxide of silicon and aluminum, can be given.

As examples of a molding method of the substrate 12, common molding methods such as injection molding, extrusion molding, compression molding, blow molding, and spin casting can be given.

The light transmitting layer 14 has a thickness of about 0.1 mm, and is formed on the surface of the substrate 12, which carries the information pattern. As examples of a method of forming the light transmitting layer 14, spin-coating, film bonding, and the like can be given. In the case of spin-coating, for example, a radiation curable resin and the like, which has a property of being cured by a radiation ray such as an ultraviolet ray and an electron beam, can be used as a material of the light transmitting layer 14. Specifically, an acrylic or epoxy UV-curable resin and the like can be used as a material of the light transmitting layer 14. In the case of film bonding, various light transmitting films can be used.

Although the optical recording medium 10 is of single-side recording type in which the light transmitting layer is formed only on one side in this embodiment, the present invention is not limited thereto. The present invention is also applicable to a double-side recording type optical recording medium in which light transmitting layers are formed on both sides. If an olefin maleimide resin substrate having a high rigidity is used for the double-side recording type optical recording medium having a symmetrical structure, the optical recording medium can be further restrained from being warped.

Although a material of the substrate is the olefin maleimide resin excellent in light transmittance, which contains the constituent units represented by the general formulae (I), (II), (III) and the like in this embodiment, the present invention is not limited thereto. Any olefin maleimide resins having the other structures can be used as a material of the substrate as long as they have a high rigidity and are hardly warped. In this case, the material is not required to have a light transmittance.

EXAMPLE

A substrate described in the above embodiment with an outer diameter of about 120 mm, an inner diameter of about 15 mm, and a thickness of about 1.1 mm was molded by using a mold for molding an optical recording medium and an injection molding machine (SD35E fabricated by Sumitomo Heavy Industries, Ltd.). A stamper was provided for a stationary-side mold half of the mold for molding an optical recording medium so as to transfer an information pattern such as pits and grooves on one side of the substrate.

Specifically, an olefin maleimide resin (fabricated by Tosoh Corporation, developed under the name of TI-160β) was used as a material of the substrate.

After a pellet of the olefin maleimide resin was placed in an oven at a temperature kept at about 100° C. for about 12 hours to be dried, the dried resin was supplied to a heating cylinder of the injection molding machine so as to be heated and molten at about 320° C. At the same time, while pressurized water whose temperature was regulated at about 110° C. was circulated in the mold, the molten resin was injected into a cavity of the mold for molding an optical recording medium, which was closed at a clamping force of about 35 t, to be formed into a disc shape. Furthermore, a cut punch provided on a movable-side mold half was moved forward to form a center hole. After cooling, the movable-side mold half was separated away from the stationary-side mold half so that the molded substrate was taken out. A bending modulus of the substrate was about 4.5 GPa, and a coefficient of linear expansion was about $58 \times 10^{-6}$/° C.

Next, on the surface of the substrate, on which the information pattern was transferred, a reflective layer, a second dielectric layer, a recording layer, and a first dielectric layer were formed by sputtering in this order. Furthermore, an acrylic UV-curable resin was expanded by spin-coating and was irradiated with an UV-ray so as to form a light transmitting layer.

After an ambient temperature of the thus obtained optical recording medium was suddenly changed from −10 to +55° C., a warp angle of the optical recording medium was measured by a known measuring method.

Specifically, after the optical recording medium was placed in a refrigerator with a temperature being regulated at about −10° C., the optical recording medium was taken out from the refrigerator so as to be attached onto a spindle within a case (CG0-1 fabricated by ASWAN Corporation; 30×40×60 cm) whose temperature was regulated at about 55° C.

The warp angle was measured by using a warp angle measuring device (LA-2000 fabricated by KEYENCE Corporation). A laser beam parallel to an axial direction was radiated on the position 2 mm away from an outer circumference (58 mm away from the center) on a surface of the optical recording medium on the light transmitting layer side so that a difference between an optical axis of incident light and an optical axis of reflected light was measured as a warp angle α (deg). Assuming that an angle formed by a virtual plane of the optical recording medium in the case where the optical recording medium is free from warp and the surface of the measured position was θ (deg), the relation between α and θ was α=2θ.

Figure 2:
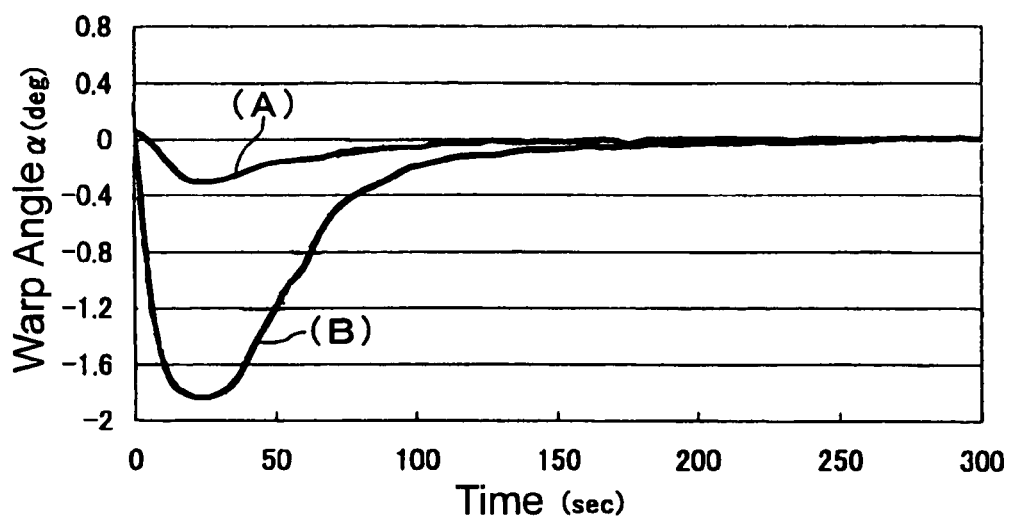
FIG. 2 is a graph showing changes in warp angle of optical recording media according to the embodiment of the present invention and a Comparative Example in comparison.

FIG. 2 is a graph showing a change in warp angle of the optical recording medium from the point 0, assuming that the point 0 is time when the optical recording medium is housed within the case. In FIG. 2, a change in warp angle of the optical recording medium according to the example of the present invention is indicated with a curve (A).

COMPARATIVE EXAMPLE

In contrast to the above-described Example, a polycarbonate resin was used as a material of a substrate in this Comparative Example. Specifically, after a pellet of the polycarbonate resin (H4000-N282 fabricated by Mitsubishi Engineering-Plastics Corporation) was placed in an oven at a temperature kept at about 120° C. for about 4 hours to be dried, the dried resin was supplied to the heating cylinder of the injection molding machine so as to be heated and molten at about 360° C. At the same time, while pressurized water whose temperature was regulated at about 125° C. was circulated in the mold, the molten resin was injected into a cavity of the mold for molding an optical recording medium, which was closed at a clamping force of about 35 t, to be formed into a disc shape. Furthermore, a cut punch provided on a movable-side mold half was moved forward to form a center hole. After cooling, the movable-side mold half was separated away from the stationary-side mold half so that the molded substrate was taken out. A bending modulus of the substrate was about 2.0 GPa, and a coefficient of linear expansion was about $70 \times 10^{-6}/°$ C.

Next, as in the above-described example, a reflective layer, a second dielectric layer, a recording layer, a first dielectric layer, and a light transmitting layer were formed in this order. After an ambient temperature of the thus obtained optical recording medium was suddenly changed from −10 to +55° C., a warp angle of the optical recording medium was measured.

In FIG. 2, a change in warp angle of the optical recording medium according to the Comparative Example is indicated with a curve (B).

As seen in FIG. 2, it is confirmed that the maximum value of the warp angle of the optical recording medium of the example is about one-fifth of that of the optical recording medium of the Comparative Example and therefore the optical recording medium of the example has a remarkably restrained warp. It is considered that a warp due to a change in ambient temperature or the like is restrained in the optical recording medium of the example as compared with the optical recording medium of the Comparative Example because the optical recording medium of the example has a higher rigidity and a smaller coefficient of linear expansion than those of the Comparative Example.

When electrical characteristics of the optical recording media of the example and the Comparative Example, such as a modulation degree and a jitter, were measured after their warp angles sufficiently converged, it was found that the electrical characteristics of both the optical recording media were identical.

As described above, the present invention has an excellent effect in that the optical recording medium including a light transmitting layer formed on a substrate so as to have a smaller thickness than the substrate is restrained from being warped to ensure the achievement of good electric characteristics.

What is claimed is:

1. An optical recording medium comprising:
a substrate; and
a light transmitting layer having a thickness smaller than that of the substrate, wherein a material of the substrate is an olefin maleimide copolymer,
the olefin maleimide copolymer is a copolymer comprising:
at least one kind of an N-phenyl-substituted maleimide unit represented by the general formula (I),
at least one kind of an N-alkyl maleimide unit represented by the general formula (II), and
an α-olefin unit represented by the general formula (III), and
wherein a copolymer composition is such that a total content of (I) and (II) is in a range of 30 to 98 mol % and a content of (III) is in a range of 70 to 2 mol %, and a weight-average molecular weight relative to polystyrene is in a range of $1 \times 10^3$ to $5 \times 10^6$

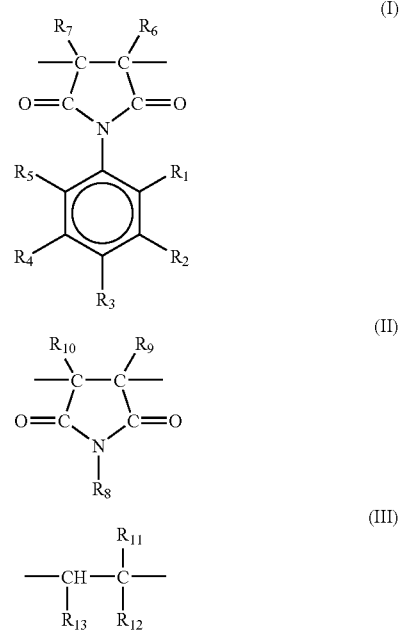

where $R_1$, $R_2$, $R_3$, $R_4$, $R_5$, $R_6$, $R_7$, $R_8$, $R_9$ and $R_{10}$ are independently hydrogen, halogen, a carboxylic acid, or a straight-chain or branched alkyl group having 1 to 8 carbon atoms, and $R_{11}$, $R_{12}$, and $R_{13}$ are independently hydrogen or an alkyl group having 1 to 6 carbons.

* * * * *